(12) United States Patent
Fukui et al.

(10) Patent No.: US 10,803,058 B2
(45) Date of Patent: Oct. 13, 2020

(54) INFORMATION PROCESSING DEVICE, METHOD OF PROCESSING INFORMATION, AND METHOD OF PROVIDING INFORMATION

(71) Applicant: SONY CORPORATION, Tokyo (JP)

(72) Inventors: Akira Fukui, Tokyo (JP); Shingo Takamatsu, Tokyo (JP); Yoshiyuki Kobayashi, Tokyo (JP); Yukio Oobuchi, Tokyo (JP); Naoki Ide, Tokyo (JP)

(73) Assignee: SONY CORPORATION, Tokyo (JP)

( * ) Notice: Subject to any disclaimer, the term of this patent is extended or adjusted under 35 U.S.C. 154(b) by 173 days.

(21) Appl. No.: 16/069,334

(22) PCT Filed: Jan. 6, 2017

(86) PCT No.: PCT/JP2017/000344
§ 371 (c)(1),
(2) Date: Jul. 11, 2018

(87) PCT Pub. No.: WO2017/168922
PCT Pub. Date: Oct. 5, 2017

(65) Prior Publication Data
US 2019/0012347 A1 Jan. 10, 2019

(30) Foreign Application Priority Data
Mar. 31, 2016 (JP) .................. 2016-073105

(51) Int. Cl.
*G06F 7/00* (2006.01)
*G06F 16/2453* (2019.01)
*G06N 3/04* (2006.01)
*G06F 16/245* (2019.01)
*G06F 16/28* (2019.01)
*G06F 16/248* (2019.01)
*G06F 16/901* (2019.01)
*G06N 3/08* (2006.01)

(52) U.S. Cl.
CPC ...... *G06F 16/24539* (2019.01); *G06F 16/245* (2019.01); *G06F 16/248* (2019.01); *G06F 16/285* (2019.01); *G06F 16/9024* (2019.01); *G06N 3/04* (2013.01); *G06N 3/08* (2013.01)

(58) Field of Classification Search
None
See application file for complete search history.

(56) References Cited

U.S. PATENT DOCUMENTS

2015/0324919 A1* 11/2015 Riggs ................ G06F 16/22
  705/36 R
2016/0283304 A1* 9/2016 Horikawa ............. G06F 11/076
  707/707

* cited by examiner

*Primary Examiner* — Alexandria Y Bromell
(74) *Attorney, Agent, or Firm* — Paratus Law Group, PLLC

(57) ABSTRACT

There is provided an information processing device capable of searching for a network structure more efficiently, the information processing device including: a structure acquisition unit configured to acquire a graph structure searched for on a basis of information related to a structure of a graph-structured network.

22 Claims, 14 Drawing Sheets

250

| NAME | STRUCTURE | PERFORMANCE INDEX | NUMBER OF PRODUCT-SUM OPERATIONS | NUMBER OF PARAMETERS | PROBLEM SETTINGS |
|---|---|---|---|---|---|
| NETWORK N1 | STRUCTURE R11 | 87.3% OF BENCHMARK | 10 BILLION TIMES | 2 MILLION | ···/···/··· |
| NETWORK N2 | STRUCTURE R12 | 47.3% OF BENCHMARK | 1 BILLION TIMES | 1 MILLION | ···/···/··· |
| ⋮ | ⋮ | ⋮ | ⋮ | ⋮ | ⋮ |

FIG.5

| NAME | STRUCTURE | PERFORMANCE INDEX | NUMBER OF PRODUCT-SUM OPERATIONS | NUMBER OF PARAMETERS | PROBLEM SETTINGS |
|---|---|---|---|---|---|
| NETWORK N1 | STRUCTURE R11 | 87.3% OF BENCHMARK | 10 BILLION TIMES | 2 MILLION | .../.../... |
| NETWORK N2 | STRUCTURE R12 | 47.3% OF BENCHMARK | 1 BILLION TIMES | 1 MILLION | .../.../... |
| ... | ... | ... | ... | ... | ... |

| | | |
|---|---|---|
| Convolution | input shape | (3,32,32) |
| | output shape | (64,32,32) |
| | learning rate factor | 0.01 |
| | vertex regularization | 0.0001 |
| | weight regularization | 0.0001 |
| | initial weight | array |
| Affine | input shape | (3,32,32) |
| | output shape | (128) |
| | learning rate factor | 0.01 |
| | vertex regularization | 0.0001 |
| | weight regularization | 0.0001 |
| | initial weight | — |
| ⋮ | ⋮ | ⋮ |

| PROBLEM CHARACTERISTICS | Classification, Regression |
|---|---|
| INPUT SPACE | IMAGE, DEPTH IMAGE, VOICE, LANGUAGE, SENSOR |
| OUTPUT SPACE | IMAGE, DEPTH IMAGE, VOICE, LANGUAGE, SENSOR, One-of-k, LIKELIHOOD, TRIPLET LOSS |

INFORMATION PROCESSING DEVICE, METHOD OF PROCESSING INFORMATION, AND METHOD OF PROVIDING INFORMATION

CROSS REFERENCE TO PRIOR APPLICATION

This application is a National Stage Patent Application of PCT International Patent Application No. PCT/JP2017/000344 (filed on Jan. 6, 2017) under 35 U.S.C. § 371, which claims priority to Japanese Patent Application No. 2016-073105 (filed on Mar. 31, 2016), which are all hereby incorporated by reference in their entirety.

TECHNICAL FIELD

The present disclosure relates to an information processing device, a method of processing information, and a method of providing information.

BACKGROUND ART

In recent years, there are various technologies as a technique relating to learning using a neural network (e.g., see Patent Literature 1). The neural network is roughly divided into three layers (input, intermediate, and output layers) Learning using a network having a plurality of intermediate layers among them is called deep learning. In this way, the deep learning improves expression capabilities of a learning device by using a network having a plurality of intermediate layers, allowing complicated problems or tasks to be learned.

CITATION LIST

Patent Literature

Patent Literature 1: JP H5-135000A

DISCLOSURE OF INVENTION

Technical Problem

Here, it is important in deep learning to perform an efficient search for a network structure (e.g., a network structure with higher performance). Thus, it is desirable to provide a technology capable of searching for a network structure more efficiently.

Solution to Problem

According to the present disclosure, there is provided an information processing device including: a structure acquisition unit configured to acquire a graph structure searched for on a basis of information related to a structure of a graph-structured network.

According to the present disclosure, there is provided a method of processing information, the method including: acquiring a graph structure searched for on a basis of information related to a structure of a graph-structured network.

According to the present disclosure, there is provided a method of providing information, the method including: providing performance of a graph structure searched for on a basis of information related to a structure of a graph-structured network.

Advantageous Effects of Invention

According to an embodiment of the present disclosure as described above, a technique capable of searching for a network structure more efficiently is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram illustrating a configuration example of a search history database.
FIG. 6 is a diagram illustrating an example of a searched network structure and parameters.
FIG. 7 is a diagram illustrating a configuration example of problem setting.

MODE(S) FOR CARRYING OUT THE INVENTION

Figure 1:
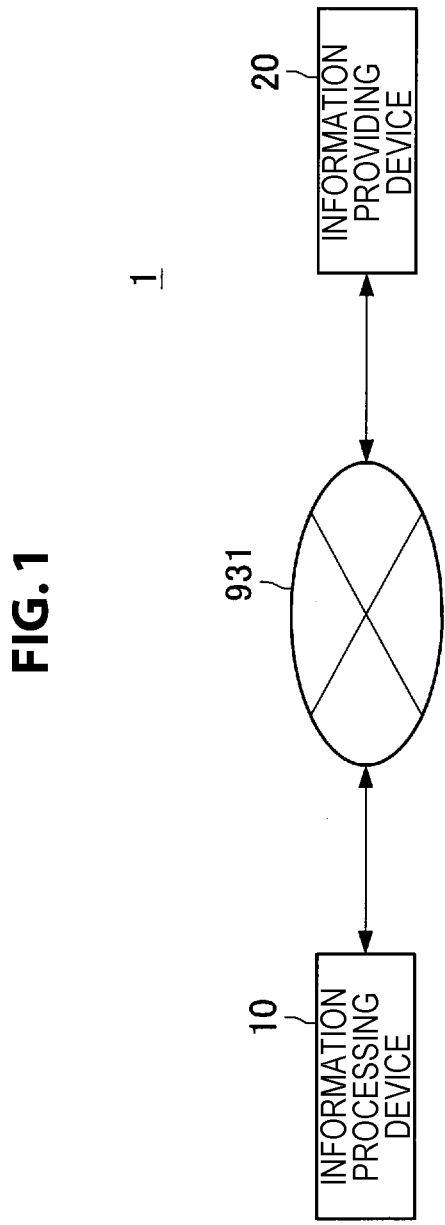
FIG. 1 is a diagram illustrating a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different numerals after the same reference sign. However, when there is no need in particular to distinguish structural elements that have substantially the same function and structure, the same reference sign alone is attached.

Moreover, the description will be given in the following order.
0. Background
1. Embodiment of present disclosure
1.1. System configuration example
1.2. Functional configuration example 1.3. Details of functions of information processing system
1.4. Hardware configuration example
2. Conclusion 0. Background There are various technologies as a technique relating to learning using a neural network (e.g., see JP H5-135000A). The neural network is roughly divided into three layers (input, intermediate, and output layers). Learning using a network having a plurality of intermediate layers among them is called deep learning. In this way, the deep learning using a network having a plurality of intermediate layers allows the difficulty of learning to be improved.

In research and development of deep learning, a lot of cost (e.g., labor, time, calculator, etc.) is necessary to search for a high-performance network structure. In addition, high-performance network structures published in papers or the like are information obtained from many network searching tasks, but it is difficult to say that the technique of network search is sufficiently disclosed only using such information. Thus, it becomes an inefficient situation where researchers around the world will repeat similar trial and error.

Thus, it is important in deep learning to perform an efficient search for a network structure (e.g., a network structure with higher performance). Thus, this specification will mainly describe technology capable of searching for a network structure more efficiently. Moreover, this specification is based on the assumption that the deep learning is mainly used as learning, but the form of learning is not limited to the deep learning. In addition, a network according to an embodiment of the present disclosure has a graph structure. The graph structure corresponds to a structure in which a layer (an affine layer, etc.) is set to an edge and a group of numeric values (e.g., vector, tensor, etc.) serving as an input or output to or from a layer is set to a node.

1. Embodiment of Present Disclosure 1.1. System Configuration Example

A configuration example of an information processing system according to an embodiment of the present disclosure is now described with reference to the drawings. FIG. 1 is a diagram illustrating a configuration example of the information processing system according to an embodiment of the present disclosure. As illustrated in FIG. 1, the information processing system 1 according to the present embodiment includes an information processing device 10 and an information providing device 20. The information processing device 10 and the information providing device 20 are capable of communicating with each other via a communication network 931.

Moreover, in the example illustrated in FIG. 1, the form of the information processing device 10 is not limited to a particular form. In one example, the information processing device 10 may be a game console, a smartphone, a mobile phone, a tablet terminal, and a personal computer (PC). Moreover, in the following description, voice (or speech) and sound are distinguished from each other. In addition, the information providing device 20 is assumed to be a computer such as a server.

The configuration example of the information processing system 1 according to the present embodiment is described above.

1.2. Functional Configuration Example

Figure 2:
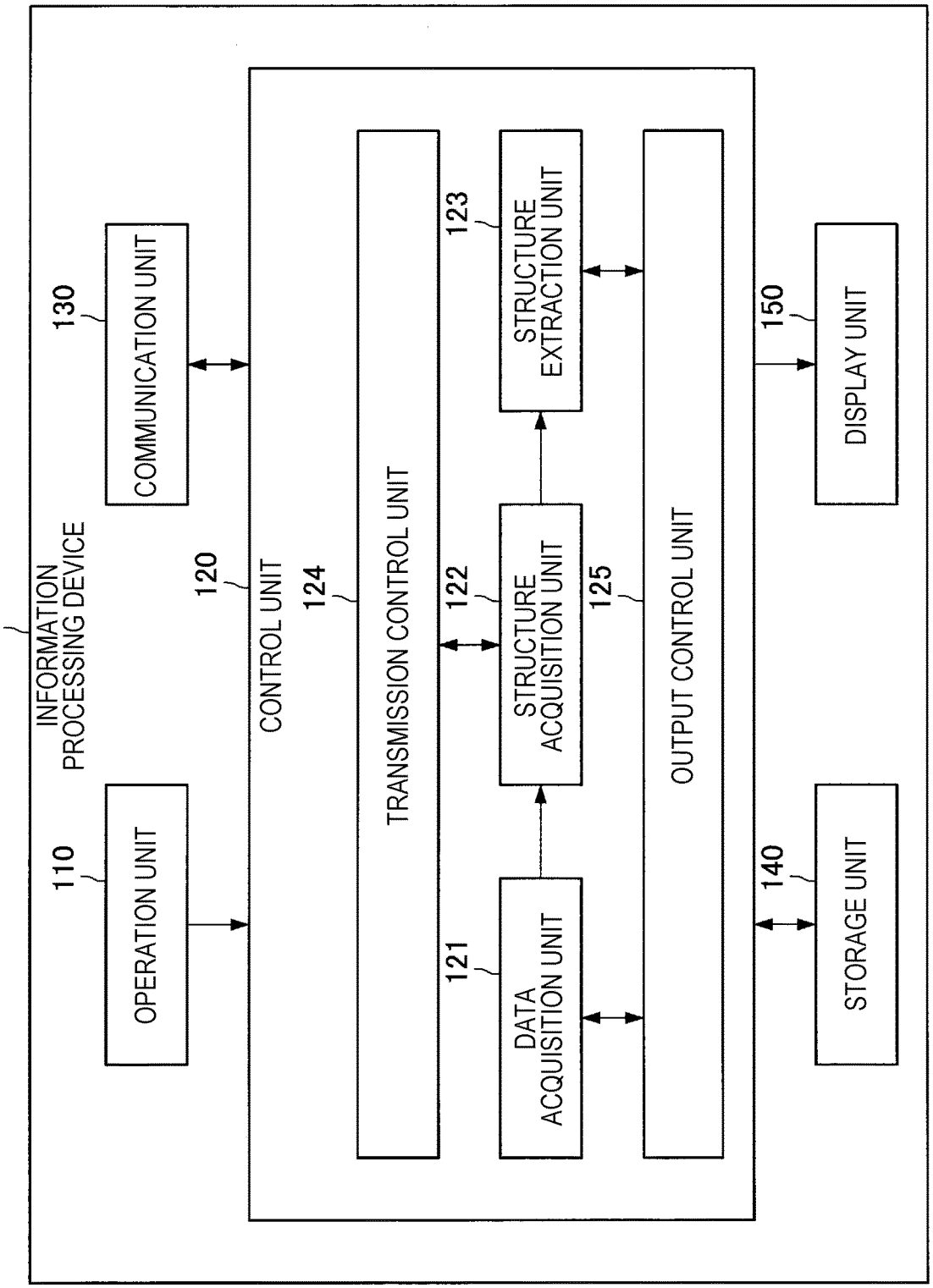
FIG. 2 is a block diagram illustrating a functional configuration example of an information processing device according to the present embodiment.

Subsequently, a functional configuration example of the information processing device 10 according to the present embodiment is described. FIG. 2 is a block diagram illustrating a functional configuration example of the information processing device 10 according to the present embodiment. As illustrated in FIG. 2, the information processing device 10 includes an operation unit 110, a control unit 120, a communication unit 130, a storage unit 140, and a display unit 150. These functional blocks included in the information processing device 10 are described below.

The operation unit 110 has a function of receiving a user's operation. In one example, the operation unit 110 may include an input device such as a mouse and a keyboard. In addition, the operation unit 110 may include a touch panel as long as it has a function of receiving the user's operation. A type of the touch panel to be employed is not limited to a particular type, and may be an electrostatic capacitive, resistive-film, infrared, or ultrasonic type. In addition, the operation unit 110 may include a camera.

The control unit 120 controls the respective units included in the information processing device 10. As illustrated in FIG. 2, the control unit 120 includes a data acquisition unit 121, a structure acquisition unit 122, a structure extraction unit 123, a transmission control unit 124, and an output control unit 125. Details of these functional blocks equipped in the control unit 120 will be described later. Moreover, the control unit 120 may include, in one example, a central processing unit (CPU), or the like. In the case where the control unit 120 includes a processing device such as a CPU, such a processing device may include an electronic circuit.

The communication unit 130 has a function of communicating with the information providing device 20. In one example, the communication unit 130 includes a communication interface. In one example, the communication unit 130 is capable of communicating with the information providing device 20 via the communication network 931 (FIG. 1).

The storage unit 140 is a recording medium that stores a program to be executed by the control unit 120 and stores data necessary for execution of the program. In addition, the storage unit 140 temporarily stores data for computation by the control unit 120. The storage unit 140 may be a magnetic storage unit device, a semiconductor storage device, an optical storage device, or a magneto-optical storage device.

The display unit 150 has a function of displaying various types of information. In one example, the display unit 150 may be a liquid crystal display, an organic electro-luminescence (EL) display, or a head-mounted display (HMD). However, the display unit 150 may be other forms of display as long as it has the function of displaying various types of information.

The functional configuration example of the information processing device 10 according to the present embodiment is described above.

Figure 3:
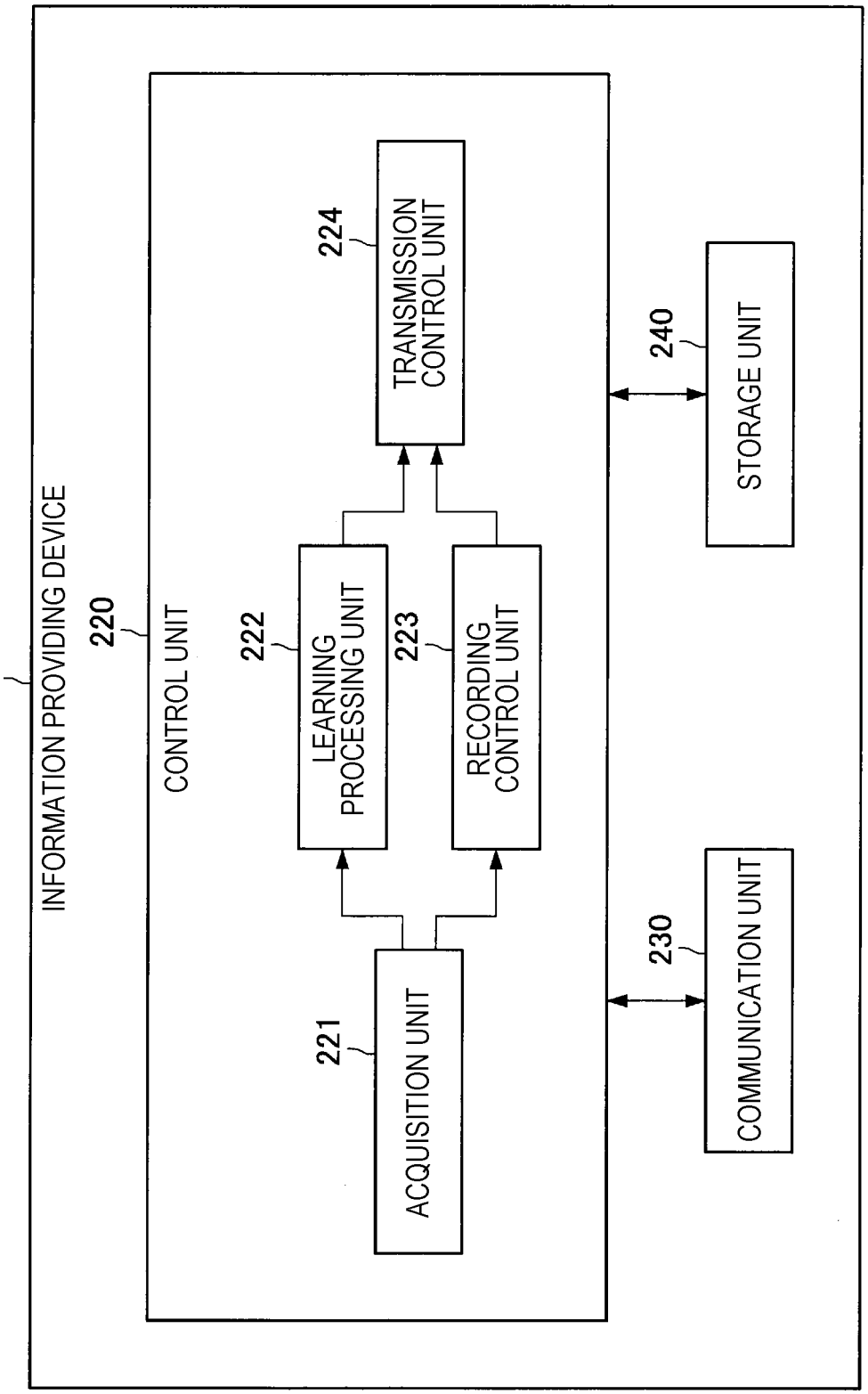
FIG. 3 is a block diagram illustrating a functional configuration example of an information providing device according to the present embodiment.

Subsequently, the functional configuration example of the information providing device 20 according to the present embodiment is described. FIG. 3 is a block diagram illustrating the functional configuration example of the information providing device 20 according to the present embodiment. As illustrated in FIG. 3, the information providing device 20 includes a control unit 220, a communication unit 230, and a storage unit 240. These functional blocks included in the information providing device 20 are described below.

The control unit 220 controls the respective units included in the information providing device 20. As illustrated in FIG. 3, the control unit 220 includes an acquisition unit 221, a learning processing unit 222, a recording control unit 223, and a transmission control unit 224. Details of these functional blocks equipped in the control unit 220 will be described later. Moreover, the control unit 220 may include, in one example, a central processing unit (CPU), or the like. In the case where the control unit 220 includes a processing device such as a CPU, such a processing device may include an electronic circuit.

The communication unit 230 has a function of communicating with the information processing device 10. In one example, the communication unit 230 includes a communication interface. In one example, the communication unit 230 is capable of communicating with the information processing device 10 via the communication network 931 (FIG. 1).

The storage unit 240 is a recording medium that stores a program to be executed by the control unit 220 and stores data necessary for execution of the program. In addition, the storage unit 240 temporarily stores data for computation by the control unit 220. The storage unit 240 may be a magnetic storage unit device, a semiconductor storage device, an optical storage device, or a magneto-optical storage device.

The functional configuration example of the information providing device 20 according to the present embodiment is described above.

1.3. Details of Functions of Information Processing System

Figure 4:
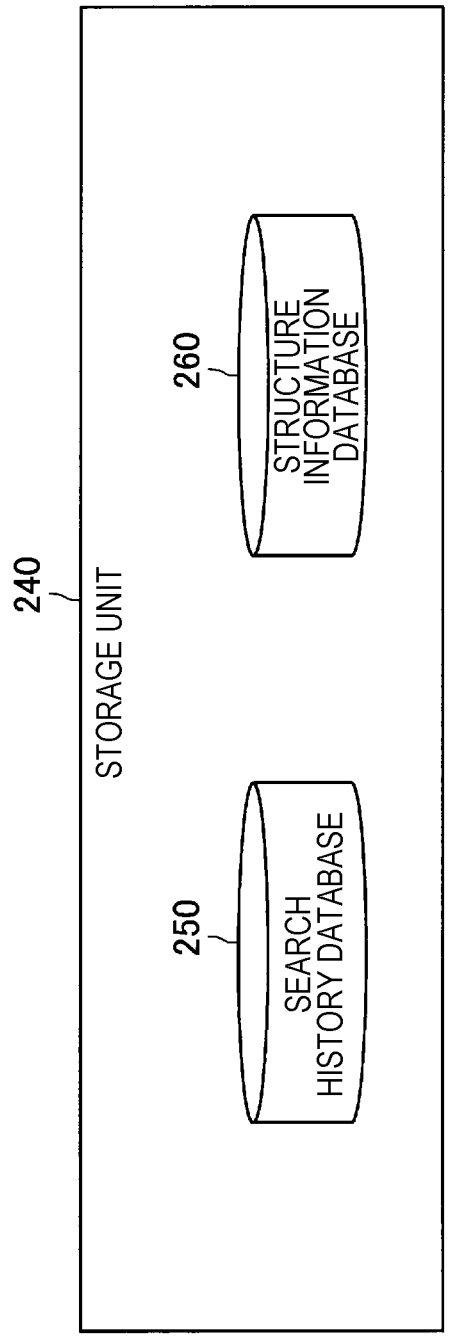
FIG. 4 is a diagram illustrating an example of a database stored in a storage unit of an information providing device.

The function of the information processing system 1 is now described in detail. FIG. 4 is a diagram illustrating an example of a database stored in the storage unit 240 of the information providing device 20. As illustrated in FIG. 4, the storage unit 240 stores a search history database 250 and a structure information database 260. The search history database 250 is a database that stores a result obtained by a network search performed previously as a history. On the other hand, the structure information database 260 is a database that stores information regarding a structure (partial structure) of a network obtained by the search. The network structure stored in the search history database 250 and the structure information database 260 may include a network structure searched for on the basis of an operation performed by a user of the information processing device 10 or may include a network structure searched for on the basis of an operation performed by a user who is different from the user of the information processing device 10.

FIG. 5 is a diagram illustrating a configuration example of the search history database 250. As illustrated in FIG. 5, the search history database 250 stores a combination of the name of the searched network, the structure (full structure) of the network, the performance index of the structure, the number of product-sum operations of the network, the number of parameters of the network, network problem settings, and the like as a search result. Hereinafter, the performance index of the structure will be described with reference to FIG. 6, and the problem setting will be described with reference to FIG. 7.

FIG. 6 is a diagram illustrating an example of the structure and parameters of the searched network. In particular, a structure R11 illustrated in FIG. 6 corresponds to R11 illustrated in FIG. 5. Referring to FIG. 6, the structure R11 has "convolution layer" and "affine layer" as part of a plurality of nodes that constitute the network. As illustrated in FIG. 6, in a case where there are two vertically adjacent nodes, these two nodes are connected vertically in the network, the upper node corresponds to a node on the input side, and the lower node corresponds to a node on the output side.

Further, various parameters are added to each node of the structure R1. In the example illustrated in FIG. 6, a plurality of parameters ("input shape", "output shape", "learning rate factor", "vertex regularization", "weight regularization", and "initial weight") are added to each node. However, the type of parameters added to each node is not limited to a particular type.

The "input shape" indicates the size of data input to the node. The "output shape" indicates the size of data output from the node. The "learning rate factor" is a coefficient for adjusting a change in weights when transition from one learning to the next is performed. The "vertex regularization" is a coefficient when the sum of squares of the intensity of firing of the intermediate layer is added to the loss function. The "weight regularization" is a coefficient when the sum of squares of weights is added to the loss function. The "initial weight" indicates a learning result in a node. The "array" is an array for storing weight information, and learned weight information is stored therein.

FIG. 7 is a diagram illustrating a configuration example of problem setting. The problem setting illustrated in FIG. 7 corresponds to the problem setting in the search history database 250 illustrated in FIG. 5. As illustrated in FIG. 7, the problem setting has problem characteristics, an input space, and an output space. The problem characteristics indicate the type of problem to be solved through the network. The input space indicates the kind of data input to the network. The output space indicates the representation format of data output from the network. "Triplet loss" is an example of a distance between a label attached to input data and output data, and includes L1 distance, L2 distance, chi-squared distance, and the like.

Figure 8:
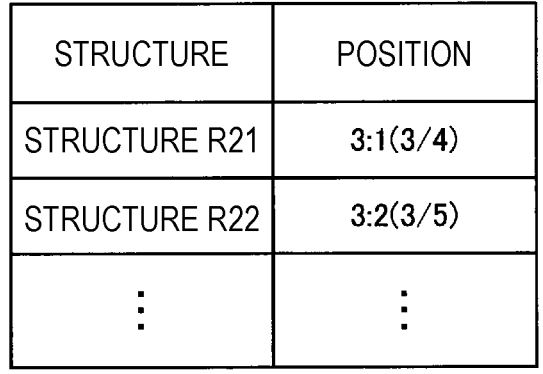
FIG. 8 is a diagram illustrating a configuration example of a structure information database.

FIG. 8 is a diagram illustrating a configuration example of the structure information database 260. As illustrated in FIG. 8, the structure information database 260 stores, as structure information, a combination of the structure (partial structure) of the network and the position of the partial structure in the network. The position of the partial structure may be represented in any way. In one example, like the position of a structure R21 illustrated in FIG. 8, the position of the partial structure may be represented by the ratio (3:1) of the distance to the input layer of the structure to the distance to the output layer, or may be represented by the proportion (3/4) of the distance to the input layer of the structure to the depth from the input layer to the output layer. In the neural network, it is important that the relative positional relationship between the partial structures e.g., the relative positional relationship between X and Y such that a certain structure X is followed by another structure Y). In one example, in a neural network of an image system, an edge detector is internally created at a portion close to the input layer, a more complicated feature quantity extractor is created from a combination of edges behind the edge detector, and a dog recognizer and a cat recognizer are created from the combination of the features. The satisfactory partial structures are expected to have their respective roles, it is expected that there are optimal positional relationships with each other depending on their roles. Thus, the search for the network is made on the basis of the relative positional relationship between the partial structure and the partial structure.

Figure 9:
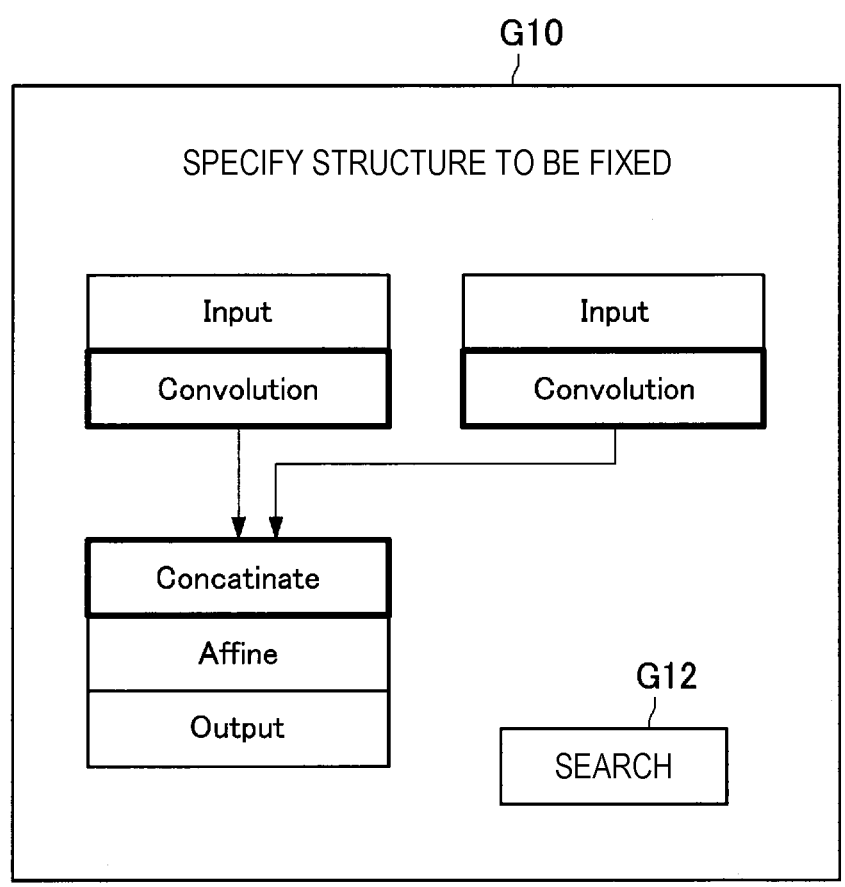
FIG. 9 is a diagram illustrating a first example of an input screen.

The description is continued with reference back to FIG. 2. The output control unit 125 of the information processing device 10 controls display of an input screen on the display unit 150. When the user gives the operation unit 110 an operation of adding, deleting, or changing a node while viewing the input screen, the output control unit 125 is capable of editing the network structure on the basis of such operation of controlling display of the network structure. FIG. 9 is a diagram illustrating a first example of the input screen. The description is given of a case where the first example of the input screen is used. Referring to FIG. 9, a network structure including two input layers, four intermediate layers, and one output layer is displayed.

The user is capable of specifying an area (hereinafter also referred to as "fixed area") to be included in one or a plurality of network structures generated by the structure acquisition unit 122 (hereinafter, also referred to as "generation network structure") on an input screen G10. In one example, as illustrated in FIG. 9, it is assumed that there is a case where the user obtains information that the partial structure including three intermediate layers (two "convolution layers" and "concatinate layer") is a satisfactory partial structure and the user wishes to include this partial structure in the generation network structure.

In such a case, as illustrated in FIG. 9, when the user gives the operation unit 110 an operation of selecting an area including these three intermediate layers as a fixed area, the data acquisition unit 121 acquires the information related to the fixed area as an example of a condition (condition regarding a performance index of the network) on the basis of such an operation. Specifically, the information related to the fixed area may include a connection relationship between a plurality of nodes (two "convolution layers" and "concatinate layer" in the example illustrated in FIG. 9) included in the fixed area and a position of the fixed area in the network structure. In addition, the position of the fixed area may be represented in a similar way to the position of the partial structure described above. Moreover, the selection operation may be performed by a tap operation or may be performed by a click operation.

When the user gives the operation unit 110 the operation of selecting a search button G12 that exists on the input screen G10, the transmission control unit 124 controls transmission of a data acquisition request to the information providing device 20. In the information providing device 20, when the acquisition unit 221 acquires the data acquisition request via the communication unit 230, the recording control unit 223 reads the search history database 250 (FIG. 5) and the structure information database 260 (FIG. 8).

In this event, data having higher performance than predetermined performance is selectively read from the search history database 250. In one example, the predetermined number of data items may be selectively read from the search history database 250 in descending order of performance. However, in a case where data determined to have higher performance than the predetermined performance is written in advance in the search history database 250, all the data items may be read from the search history database 250.

Further, in the present specification, a case is assumed in which a partial structure commonly appearing beyond a predetermined frequency in a plurality of full structures determined to have higher performance than predetermined performance is written in advance in the structure information database 260. Thus, all the data items may be read from the structure information database 260. Alternatively, the predetermined number of data items may be selectively read from the structure information database 260 in descending order of performance.

In the information providing device 20, when the transmission control unit 224 controls transmission of the data read from the search history database 250 and the structure information database 260, the data read from the search history database 250 and the structure information database 260 is acquired by the data acquisition unit 121 in the information processing device 10.

Subsequently, the structure acquisition unit 122 generates one or a plurality of generation network structures depending on the condition specified by the user (the condition regarding the performance index of the network) (the information related to the structure) and the data read from the search history database 250 and the structure information database 260. The graph structure-based automatic search (e.g., genetic programming or graph structure-based automatic search using reinforcement learning) may be performed to generate the generation network structure. In other words, the structure acquisition unit 122 separates and reconnects the graph structures of the data read from the search history database 250 and the structure information database 260, thereby generating one or a plurality of generation network structures.

In one example, the structure acquisition unit 122 may generate the generation network structure on the basis of partial replacement in the structure (full structure) read from the search history database 250. In addition, the structure acquisition unit 122 may generate the generation network structure on the basis of the connection to another structure of the structure (partial structure) read from the structure information database 260.

In this event, the structure acquisition unit 122 may generate the generation network structure so that a plurality of nodes included in the fixed area (two "convolution layers" and "concatinate layer" in the example illustrated in FIG. 9) have the connection relationship and exist at the position of the fixed area. The transmission control unit 124 controls transmission of the generation network structure to the information providing device 20.

In the information providing device 20, when the generation network structure is acquired by the acquisition unit 221 via the communication unit 230, the learning in the generation network structure using the learning data is performed by the learning processing unit 222. In addition, the learning processing unit 222 evaluates the learned generation network structure using the data for evaluation. The evaluation result is controlled to be recorded in the search history database 250 as a search history by the recording control unit 223 and is controlled to be transmitted to the information processing device 10 by the transmission control unit 224. In the information processing device 10, the structure acquisition unit 122 acquires the evaluation result via the communication unit 130.

Moreover, the evaluation result may include some evaluation methods (e.g., recognition rate, the number of product-sum operations (calculation amount) of generation network structure) related to the performance index, power consumption, and calculation amount of the generation network structure, the number of parameters, the number of nodes, and the like. The structure extraction unit 123 extracts a partial structure from one or a plurality of generation network structures on the basis of the evaluation result. Specifically, the structure extraction unit 123 extracts a partial structure appearing beyond a predetermined frequency in a generation network structure having higher performance than the predetermined performance among one or a plurality of generation network structures.

Further, the structure extraction unit 123 may extract a partial structure appearing beyond a predetermined frequency in a generation network structure having the number of product-sum operations (calculation amount) smaller than the predetermined number of product-sum operations (calculation amount) among one or a plurality of generation network structures. In addition, the structure extraction unit 123 may extract a partial structure appearing beyond a predetermined frequency in a generation network structure having the number of parameters smaller than the predetermined number of parameters among one or a plurality of generation network structures.

Further, the structure extraction unit 123 may extract a partial structure appearing beyond a predetermined frequency in a generation network structure having the number of nodes smaller than the predetermined number of nodes among one or a plurality of generation network structures. Furthermore, the structure extraction unit 123 may extract the partial structure in consideration of the learned weight in addition to the structure. Subsequently, the output control unit 125 may control output (e.g., display) of the generation network structure and the performance index. In addition, the output control unit 125 may control predetermined display (e.g., a highlight display for a partial structure, etc.) corresponding to the partial structure.

Subsequently, the transmission control unit 124 controls transmission of the extracted partial structure and the position of the partial structure in the generation network structure to the information providing device 20. In the information providing device 20, when the acquisition unit 221 acquires the partial structure and the position of the partial structure in the generation network structure via the communication unit 230, the recording control unit 223 causes the partial structure and the position of the partial structure in the generation network structure to be recorded in the structure information database 260.

Figure 10:
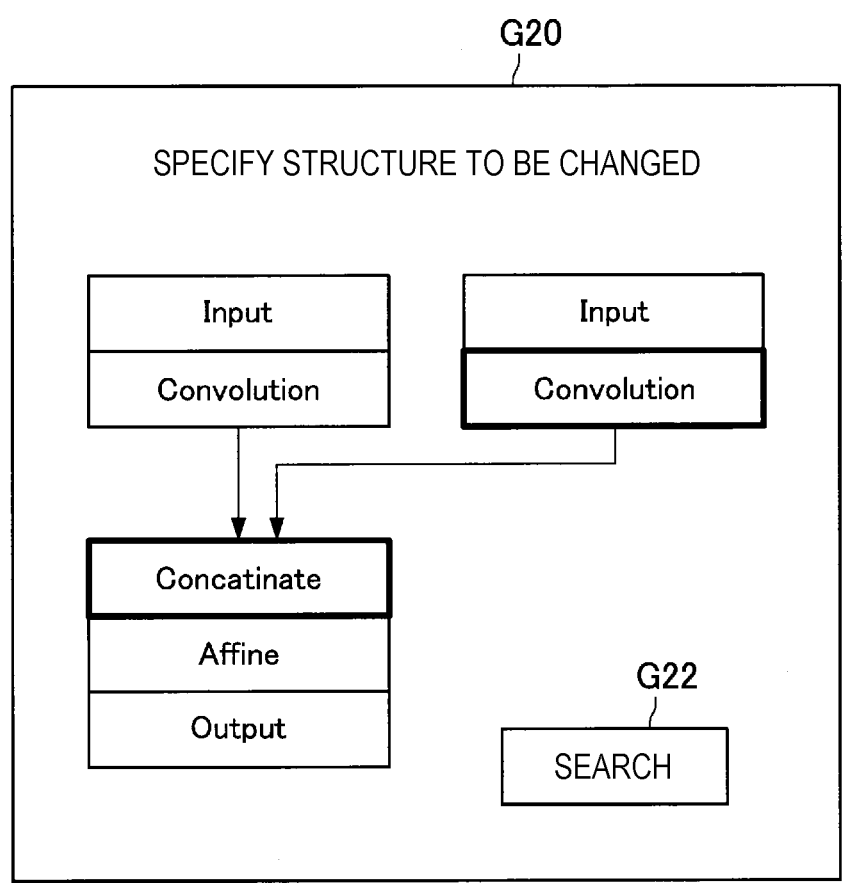
FIG. 10 is a diagram illustrating a second example of the input screen.

The case of using the first example of the input screen is described above. FIG. 10 is a diagram illustrating a second example of the input screen. A case of using the second example of the input screen is now described. Referring to FIG. 10, a network structure including two input layers, four intermediate layers, and one output layer is displayed.

The user is capable of specifying an area to be searched (hereinafter also referred to as "search area") by the structure acquisition unit 122 in an input screen G20. In one example, as illustrated in FIG. 10, it is assumed that there is a case where the user wishes to search for a partial structure including two intermediate layers ("convolution layer" on the right side and "concatinate layer") while fixing two input layers, two intermediate layers ("convolution layer" on the left side and "affine layer", and one output layer.

In such a case, as illustrated in FIG. 10, when the user gives the operation unit 110 an operation of selecting an area including these two intermediate layers as a. search area, the data acquisition unit 121 acquires information related to this search area on the basis of such an operation. Specifically, the information related to the search area may include a connection relationship between a plurality of nodes (two input layers, two intermediate layers ("convolution layer" on the left side and "affine layer"), and one output layer, in the example illustrated in FIG. 10) that constitute a portion other than the search area and a position other than the search area. In addition, the position other than the search area may be represented in a similar way to the position of the partial structure described above.

When the user gives the operation unit 110 an operation of selecting a. search button G22 existing on the input screen G20, the data read from the search history database 250 and the structure information database 260 is acquired by the data acquisition unit 121, which is similar to the case of using the first example of the input screen. Subsequently, the structure acquisition unit 122 generates one or a plurality of generation network structures corresponding to the condition specified by the user (the condition regarding the performance index of the graph-structured network) and the data read from the search history database 250 and the structure information database 260, which is similar to the case of using the first example of the input screen.

In one example, the structure acquisition unit 122 may generate the generation network structure on the basis of the partial replacement in the structure (full structure) read from the search history database 250, which is similar to the case of using the first example of the input screen. In addition, the structure acquisition unit 122 may generate the generation network structure on the basis of the connection to another structure of the structure (partial structure) read from the structure information database 260.

In this event, the structure acquisition unit 122 may generate the generation network structure so that a plurality of nodes (two input layers, two intermediate layers ("convolution layer" on the left side and "affine layer"), and one output layer, in the example illustrated in FIG. 10) that constitute portions other than the search area have the connection relationship and exist at the positions of the plurality of nodes. The transmission control unit 124 controls transmission of the generation network structure to the information providing device 20. The subsequent operations can be executed in a similar way to the case of using the first example of the input screen.

Figure 11:
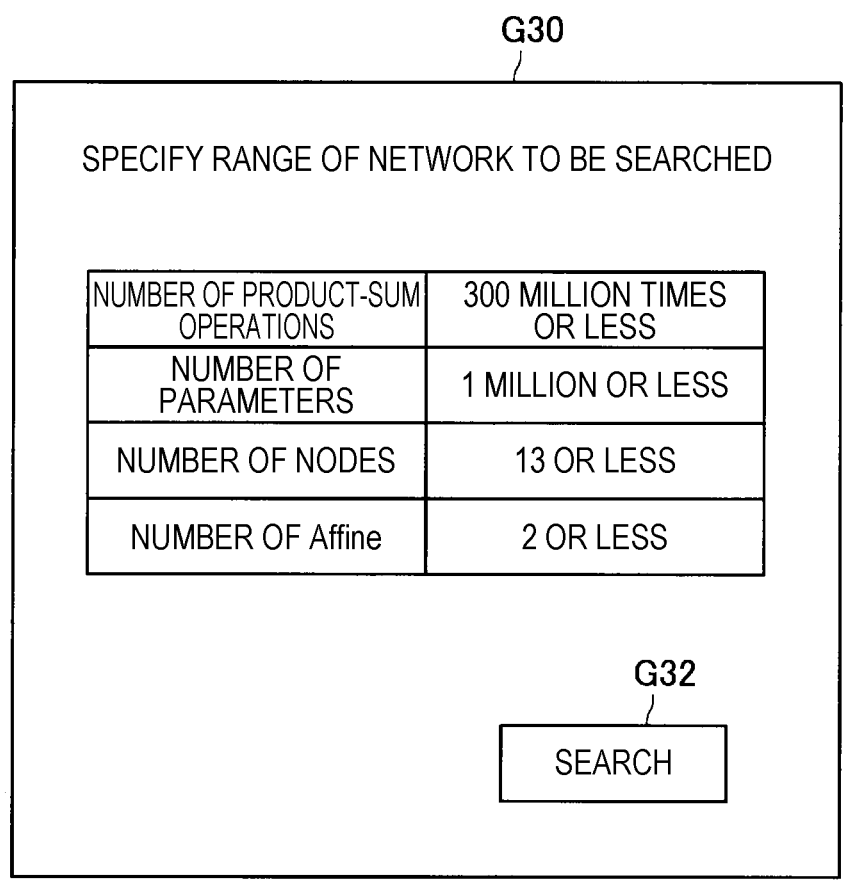
FIG. 11 is a diagram illustrating a third example of the input screen.

The case of using the second example of the input screen is described above. FIG. 11 is a diagram illustrating a third example of the input screen. A case of using the third example of the input screen is now described. Referring to FIG. 11, the number of product-sum operations, the number of parameters, the number of nodes, and an affine layer are displayed as an example of a condition to be fulfilled by the generation network structure.

The user is able to specify a condition to be fulfilled by the generation network structure generated by the structure acquisition unit 122 in an input screen G30. In one example, as illustrated in FIG. 11, it is assumed that there is a case where the user wishes to search for a network structure of the number of product-sum operations "300 million times or less", the number of parameters "1 million or less", the number of nodes "13 or less", and the affine layer "2 or less". In such a case, as illustrated in FIG. 11, when the user gives the operation unit 110 an operation of selecting these conditions, the data acquisition unit 121 acquires this condition on the basis of such an operation.

When the user gives the operation unit 110 an operation of selecting a search button G32 existing on the input screen G30, the data read from the search history database 250 and the structure information database 260 is acquired by the data acquisition unit 121, which is similar to the case of using the first example of the input screen. Subsequently, the structure acquisition unit 122 generates one or a plurality of generation network structures corresponding to the condition (condition regarding the performance index of the network) specified by the user and the data read from the search history database 250 and the structure information database 260, which is similar to the case of using the first example of the input screen.

In one example, the structure acquisition unit 122 may generate the generation network structure on the basis of the partial replacement in the structure (full structure) read from the search history database 250, which is similar to the case of using the first example of the input screen. In addition, the structure acquisition unit 122 may generate the generation network structure on the basis of the connection to another structure of the structure (partial structure) read from the structure information database 260.

In this event, the structure acquisition unit 122 may generate so that the condition selected in the input screen G30 exists to be satisfied. The transmission control unit 124 controls transmission of the generation network structure to the information providing device 20. The subsequent operations can be executed in a similar way to the case of using the first example of the input screen.

Figure 12:
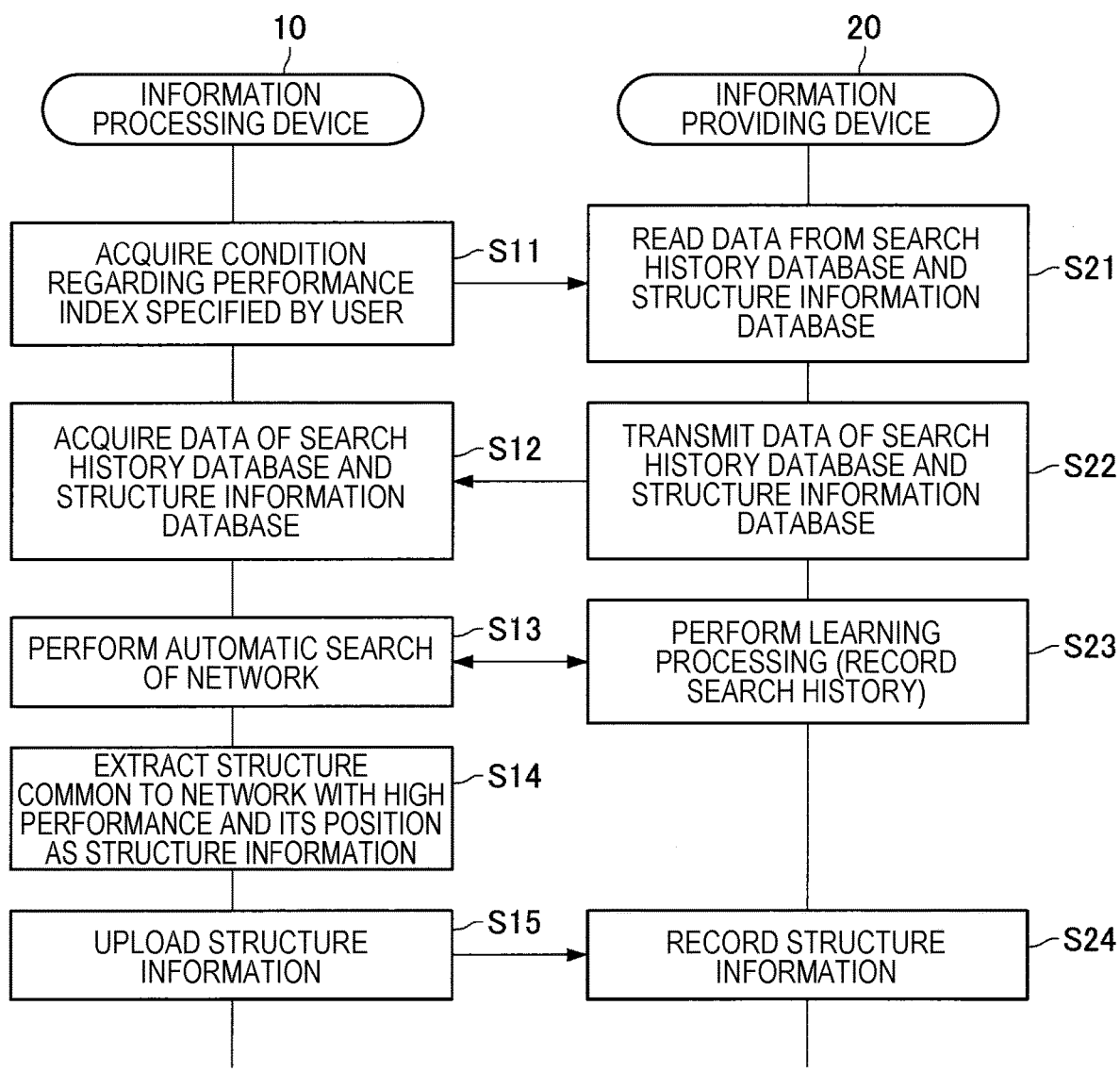
FIG. 12 is a flowchart illustrating an operation example of the information processing system.

The case of using the third example of the input screen is described above. An operation example of the information processing system 1 according to the embodiment of the present disclosure is now described. FIG. 12 is a flowchart illustrating an operation example of the information processing system 1 according to the embodiment of the present disclosure. As illustrated in FIG. 12, first, in the information processing device 10, the data acquisition unit 121 acquires a condition (condition regarding the performance index of the network) specified by the user through the operation unit 110 (S11). Then, the transmission control unit 124 controls the communication unit 130 so that the data acquisition request is transmitted to the information providing device 20.

Then, in the information providing device 20, when the acquisition unit 221 acquires the data acquisition request via the communication unit 230, the recording control unit 223 reads data from the search history database 250 and the structure information database 260 (S21). Then, the transmission control unit 224 controls the communication unit 230 so that the data read from the search history database 250 and the structure information database 260 is transmitted to the information processing device 10 (S22). In the information processing device 10, the data acquisition unit 121 acquires data of the search history database 250 and the structure information database 260 via the communication unit 130 (S12).

Subsequently, the structure acquisition unit 122 performs an automatic search of the network (S13). More specifically, the structure acquisition unit 122 generates one or more a plurality of generation network structures on the basis of a condition specified by the user (a condition regarding the performance index of the network) and a network structure group registered in advance (data read from the search history database 250 and the structure information database 260). The structure acquisition unit 122 controls the communication unit 130 so that the generation network structure is transmitted to the information providing device 20.

Next, in the information providing device 20, when the acquisition unit 221 acquires the generation network structure via the communication unit 230, the learning processing unit 222 performs learning processing in the generation network structure using the data for learning (S23). In addition, the learning processing unit 222 evaluates the learned generation network structure using the data for evaluation. In this event, the evaluation result is recorded in the search history database 250 by the recording control unit 223. In addition, the transmission control unit 224 controls transmission of the performance index of the generation network structure to the information processing device 10.

In the information processing device 10, when the structure acquisition unit 122 acquires the performance index of the generation network structure via the communication unit 130, the structure extraction unit 123 extracts, as structure information, a partial structure common to the generation network structure having higher performance than the predetermined performance and the position of the partial structure (S14). Then, the transmission control unit 124 controls the communication unit 130 so that the structure information is uploaded to the information providing device 20 (S15). In the information providing device 20, when the acquisition unit 221 acquires the structure information via the communication unit 230, the structure information is recorded in the structure information database 260 by the recording control unit 223 (S24).

1.4. Hardware Configuration Example

Figure 13:
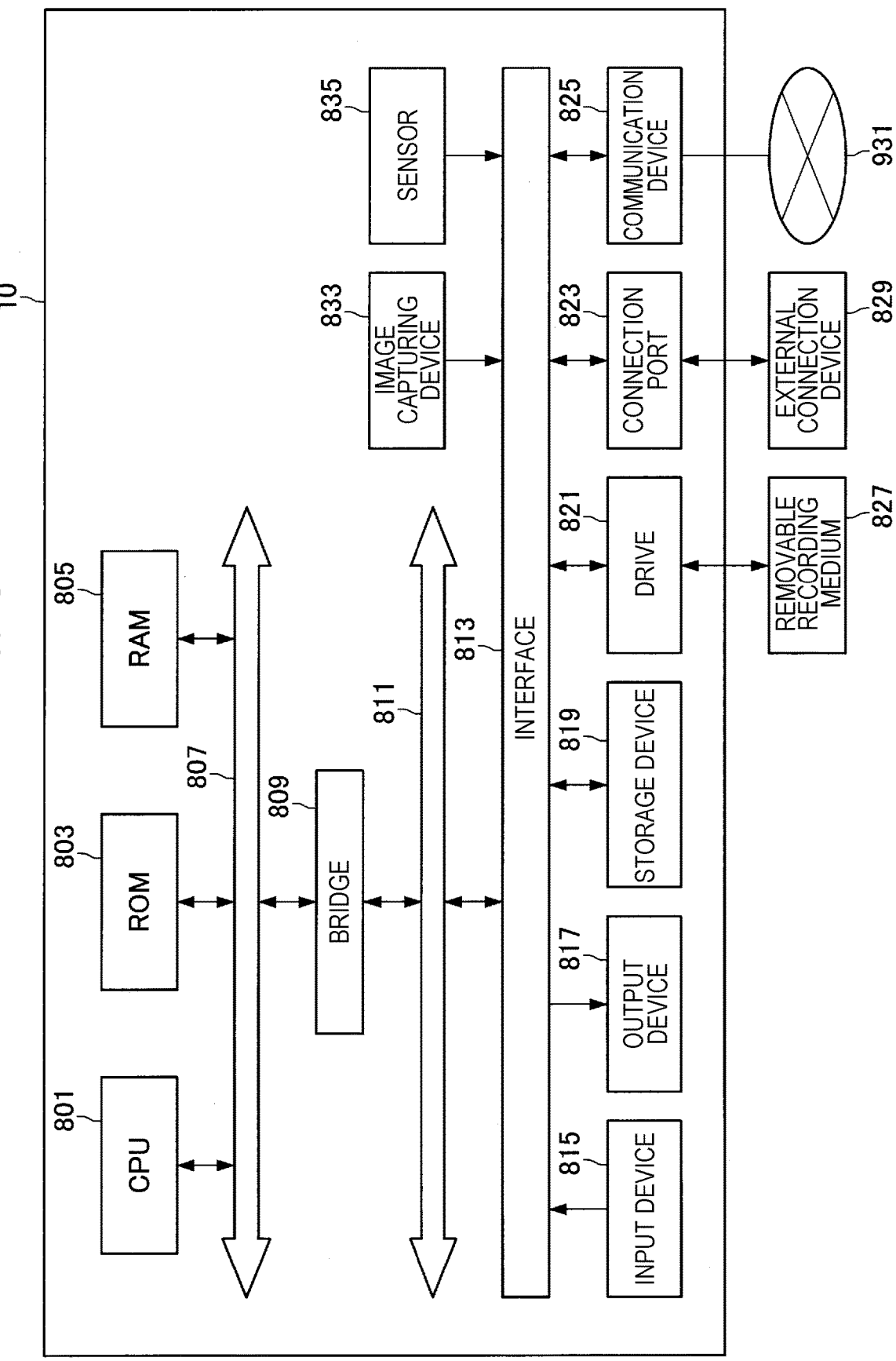
FIG. 13 illustrates a hardware configuration of the information processing device.

Next, the hardware configuration of the information processing device 10 according to an embodiment of the present disclosure is described with reference to FIG. 13. FIG. 13 is a block diagram illustrating a hardware configuration example of the information processing device 10 according to an embodiment of the present disclosure.

As illustrated in FIG. 13, the information processing device 10 includes a central processing unit (CPU) 801, a read-only memory (ROM) 803, and a random-access memory (RAM) 805. In addition, the information processing device 10 may include a host bus 807, a bridge 809, an external bus 811, an interface 813, an input device 815, an output device 817, a storage device 819, a drive 821, a connection port 823, and a communication device 825. The information processing device 10 may further include an image capturing device 833 and a sensor 835 as necessary. In conjunction with, or in place of, the CPU 801, the information processing device 10 may have a processing circuit called a digital signal processor (DSP) or application specific integrated circuit (ASIC).

The CPU 801 functions as an arithmetic processing unit and a control unit, and controls the whole operation in the information processing device 10 or a part thereof in accordance with various programs recorded in the ROM 803, the RAM 805, the storage device 819, or a removable recording medium 827. The ROM 803 stores programs, operation parameters, or the like used by the CPU 801. The RAM 805 temporarily stores programs used in the execution by the CPU 801, parameters that vary as appropriate in the execution, or the like. The CPU 801, the ROM 803, and the RAM 805 are connected with each other via the host bus 807 that includes an internal bus such as a CPU bus. Furthermore, the host bus 807 is connected to the external bus 811 such as peripheral component interconnect/interface (PCI) bus via the bridge 809.

The input device 815 is, in one example, a device operated by a user, such as a mouse, a keyboard, a touch panel, a button, a switch, and a lever. The input device 815 may include a microphone for detecting user's speech. The input device 815 may be, in one example, a remote control device using infrared rays or other radio waves, or may be an external connection device 829 such as a cellular phone that supports the operation of the information processing device 10. The input device 815 includes an input control circuit that generates an input signal on the basis of the information input by the user and outputs it to the CPU 801. The user operates the input device 815 to input various data to the information processing device 10 and to instruct the information processing device 10 to perform a processing operation. In addition, the image capturing device 833, which will be described later, can also function as an input device by capturing the motion of the user's hand, user's finger, or the like. In this case, the pointing position may be determined depending on the motion of the hand or the direction of the finger.

The output device 817 includes a device capable of notifying visually or audibly the user of the acquired information. The output device 817 may be a display device such as a liquid crystal display (LCD), a plasma display panel (PDP), an organic electro-luminescence (EL) display, and a projector, a hologram display device, an audio output device such as a speaker and a headphone, as well as printer devices or the like. The output device 817 outputs the result obtained by the processing of the information processing device 10 as a video such as a text or an image, or outputs it as audio such as a speech or sound. In addition, the output device 817 may include, in one example, a light for lighting up the surroundings.

The storage device 819 is a data storage device configured as an example of a storage portion of the information processing device 10. The storage device 819 includes, in one example, a magnetic storage unit device such as hard disk drive (HDD), a semiconductor storage device, an optical storage device, and a magneto-optical storage device. The storage device 819 stores programs executed by the CPU 801, various data, various types of data obtained from the outside, and the like.

The drive 821 is a reader-writer for a removable recording medium 827 such as a magnetic disk, an optical disk, a magneto-optical disk, and a semiconductor memory, and is incorporated in the information processing device 10 or externally attached thereto. The drive 821 reads the information recorded on the loaded removable recording medium 827 and outputs it to the RAM 805. In addition, the drive 821 writes a record in the loaded removable recording medium 827.

The connection port 823 is a port for directly connecting the device to the information processing device 10. The connection port 823 may be, in one example, a universal serial bus (USB) port, an IEEE 1394 port, or a small computer device interface (SCSI) port. In addition, the connection port 823 may be, in one example, an RS-232C port, an optical audio terminal, or high-definition multimedia interface (HDMI, registered trademark) port. The connection of the external connection device 829 to the connection port 823 makes it possible to exchange various kinds of data between the information processing device 10 and the external connection device 829.

The communication device 825 is, in one example, a communication interface including a communication device or the like, which is used to be connected to the communication network 931. The communication device 825 may be, in one example, a communication card for wired or wireless local area network (LAN), Bluetooth (registered trademark), or wireless USB (WUSB). In addition, the communication device 825 may be, in one example, a router for optical communication, a router for asymmetric digital subscriber line (ADSL), or a modem for various communications. The communication device 825 transmits and receives signals or the like using a predetermined protocol such as TCP/IP, in one example, with the Internet or other communication devices. In addition, the communication network 931 connected to the communication device 825 is a network connected by wire or wireless, and is, in one example, the Internet, home LAN, infrared communication, radio wave communication, satellite communication, or the like.

The image capturing device 833 is a device that captures a real space and generates a captured image, by using an image sensor such as charge-coupled device (CCD) or complementary-metal-oxide semiconductor (CMOS) and various members such as a lens for controlling imaging of a subject image on the image sensor. The image capturing device 833 can capture a still image or a moving image.

The sensor 835 is, in one example, various sensors such as an acceleration sensor, a gyro sensor, a geomagnetic sensor, an optical sensor, and a sound sensor. The sensor 835 acquires information related to the state of the information processing device 10 such as the attitude of the casing of the information processing device 10, and acquires information related to the surrounding environment of the information processing device 10 such as brightness or noise around the information processing device 10. The sensor 835 may also include a GPS sensor that receives global positioning system (GPS) signals and measures the latitude, longitude, and altitude of the device.

Figure 14:
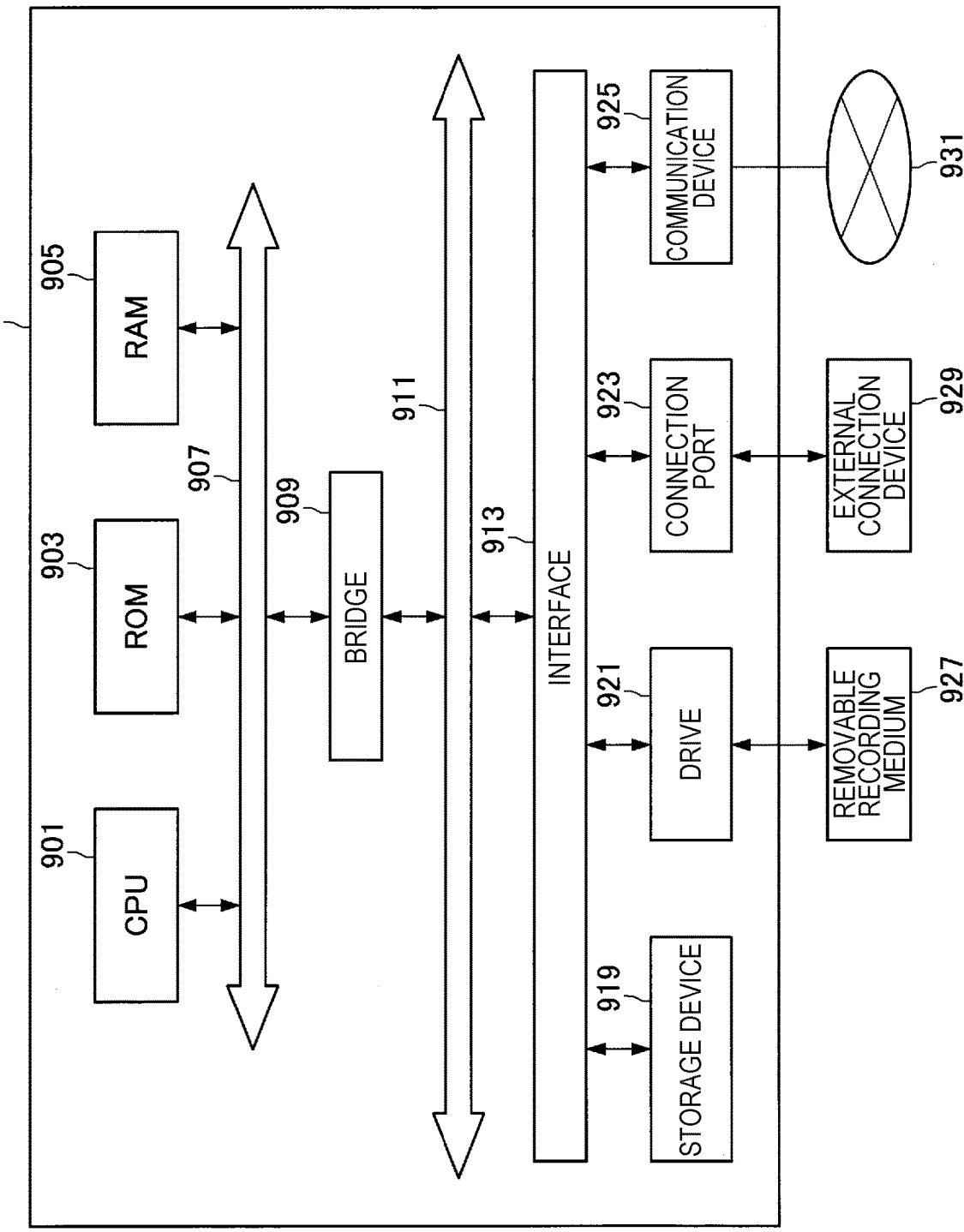
FIG. 14 illustrates a hardware configuration of the information providing device.

Next, the hardware configuration of the information providing device 20 according to an embodiment of the present disclosure is described with reference to FIG. 14. FIG. 14 is a block diagram illustrating a hardware configuration example of the information providing device 20 according to an embodiment of the present disclosure.

As illustrated in FIG. 14, the information providing device 20 includes a central processing unit (CPU) 901, a read-only memory (ROM) 903, and a random-access memory (RAM) 905. In addition, the information providing device 20 may include a host bus 907, a bridge 909, an external bus 911, an interface 913, a storage device 919, a drive 921, a connection port 923, and a communication device 925. In conjunction with, or in place of, the CPU 901, the information processing device 10 may have a processing circuit called a digital signal processor (DSP) or application specific integrated circuit (ASIC).

The CPU 901 functions as an arithmetic processing unit and a control unit, and controls the whole operation in the information providing device 20 or a part thereof in accordance with various programs recorded in the ROM 903, the RAM 905, the storage device 919, or a removable recording medium 927. The ROM 903 stores programs, operation parameters, or the like used by the CPU 901. The RAM 905 temporarily stores programs used in the execution by the CPU 901, parameters that vary as appropriate in the execution, or the like. The CPU 901, the ROM 903, and the RAM 905 are connected with each other via the host bus 907 that includes an internal bus such as a CPU bus. Furthermore, the host bus 907 is connected to the external bus 911 such as peripheral component interconnect/interface (PCI) bus via the bridge 909.

The storage device 919 is a data storage device configured as an example of a storage portion of the information providing device 20. The storage device 919 includes, in one example, a magnetic storage unit device such as hard disk drive (HDD), a semiconductor storage device, an optical storage device, and a magneto-optical storage device. The storage device 919 stores programs executed by the CPU 901, various data, various types of data obtained from the outside, and the like.

The drive 921 is a reader-writer for a removable recording medium 927 such as a magnetic disk, an optical disk, a magneto-optical disk, and a semiconductor memory, and is incorporated in the information providing device 20 or externally attached thereto. The drive 921 reads the information recorded on the loaded removable recording medium 927 and outputs it to the RAM 905. In addition, the drive 921 writes a record in the loaded removable recording medium 927.

The connection port 923 is a port for directly connecting the device to the information providing device 20. The connection port 923 may be, in one example, a universal serial bus (USB) port, an IEEE 1394 port, or a small computer system interface (SCSI) port. In addition, the connection port 923 may be, in one example, an RS-232C port, an optical audio terminal, or high-definition multimedia interface (HDMI, registered trademark) port. The connection of the external connection device 929 to the connection port 923 makes it possible to exchange various kinds of data between the information providing device 20 and the external connection device 929.

The communication device 925 is, in one example, a communication interface including a communication device or the like, which is used to be connected to a communication network 931. The communication device 925 may be, in one example, a communication card for wired or wireless local area network (LAN), Bluetooth (registered trademark), or wireless USB (WUSB). In addition, the communication device 925 may be, in one example, a router for optical communication, a router for asymmetric digital subscriber line (ADSL), or a modem for various communications. The communication device 925 transmits and receives signals or the like using a predetermined protocol such as TCP/IP, in one example, with the Internet or other communication devices. In addition, the communication network 931 connected to the communication device 925 is a network connected by wire or wireless, and is, in one example, the Internet, home LAN, infrared communication, radio wave communication, satellite communication, or the like.

2. CONCLUSION

As described above, according to the embodiment of the present disclosure, the information processing device 10 including the structure acquisition unit 122 that acquires the graph structure searched for on the basis of the information related to the structure of the graph-structured network is provided. According to such a configuration, it is possible to search for the network structure more efficiently.

Further, according to the embodiment of the present disclosure, a result of trial and error performed by researchers around the world is shared, so a new network structure can be found efficiently and the performance of the network structure is improved with ease. In addition, according to the embodiment of the present disclosure, it is expected that a lot of cost (e.g., labor, time, calculator, etc.) necessary to search for a high performance network structure is reduced.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, the above description is given of the example in which a condition regarding the performance index of a network are acquired using an input screen is acquired. However, the acquisition of the condition regarding the performance index of the network is not limited to the example of using the input screen. In one example, the condition regarding the performance index of the network may be specified by description in the YAML format file, description in the extensible markup language (XML) file, or description in other formats of file (e.g., a file in binary format).

Further, the positions of the respective components are not particularly limited as long as the operation of the information processing system 1 described above is performed. In one example, the above description is given of the example in which the information providing device 20 includes the learning processing unit 222, the search history database 250, and the structure information database 260. However, part or all of the learning processing unit 222, the search history database 250, and the structure information database 260 may be provided in the information processing device 10.

In one example, when the learning processing unit 222, the search history database 250, and the structure information database 260 are provided in the information processing device 10, the information processing system 1 does not necessarily include the information providing device 20. The above description is given of the example in which the structure acquisition unit 122 and the structure extraction unit 123 are provided in the information processing device 10. However, part or all of the structure acquisition unit 122 and the structure extraction unit 123 may be provided in the information providing device 20.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a structure acquisition unit configured to acquire a graph structure searched for on a basis of information related to a structure of a graph-structured network.

(2)

The information processing device according to (1), in which the structure acquisition unit acquires one or a plurality of graph structures and a performance index of the graph structure, the graph structure being generated depending on information related to a structure specified by a user and a network structure group registered in advance, and the information processing device includes an output control unit configured to control output of the graph structure and the performance index.

(3)

The information processing device according to (2), in which the network structure group includes a full structure of a network searched previously.

(4)

The information processing device according to (3), in which the graph structure is generated on a basis of a graph structure-based search in the full structure.

(5)

The information processing device according to (3) or (4), in which the graph structure is generated depending on a full structure having higher performance than predetermined performance selected from the network structure group.

(6)

The information processing device according to (3) or (4), in which the network structure group includes the full structure determined to have higher performance than predetermined performance.

(7)

The information processing device according to any one of (2) to (6), in which the network structure group includes a partial structure of a network searched previously.

(8)

The information processing device according to (7), in which the graph structure is generated on a basis of a connection of the partial structure to another structure.

(9)

The information processing device according to (7) or (8),
in which the network structure group includes a partial structure commonly appearing beyond a predetermined frequency in a plurality of full structures determined to have higher performance than predetermined performance.

(10)

The information processing device according to any one of (1) to (9),
in which the information related to the structure includes information related to a fixed area to be included in the graph structure.

(11)

The information processing device according to (10),
in which the information related to the fixed area includes a connection relationship between a plurality of nodes included in the fixed area and a position of the fixed area in the graph structure, and
the graph structure is generated so that the plurality of nodes have the connection relationship and exist at the position of the fixed area.

(12)

The information processing device according to (10) or (11),
in which the fixed area is determined on a basis of a user's selection operation with respect to a predetermined network structure.

(13)

The information processing device according to any one of (1) to (9),
in which the information related to the structure includes a predetermined network structure in which a part of the predetermined network structure is set as a search area.

(14)

The information processing device according to (13),
in which information related to the search area includes a connection relationship between a plurality of nodes that constitute a portion other than the search area and a position of the portion other than the search area in the graph structure, and
the graph structure is generated so that the plurality of nodes have the connection relationship and exist at the position of the portion other than the search area.

(15)

The information processing device according to (13) or (14),
in which the search area is determined on a basis of a user's selection operation with respect to the predetermined network structure.

(16)

The information processing device according to any one of (1) to (9),
in which the information related to the structure includes a condition to be fulfilled by the graph structure.

(17)

The information processing device according to any one of (2) to ( ),
in which the output control unit controls display of the graph structure and the performance index.

(18)

The information processing device according to any one of (2) to (9), including:
a structure extraction unit configured to extract a partial structure appearing beyond a predetermined frequency in a graph structure having higher performance than predetermined performance among the graph structures.

(19)

The information processing device according to (18),
in which the output control unit controls predetermined display corresponding to the partial structure.

(20)

The information processing device according to any one of (2) to (9),
in which the network structure group includes a network structure searched for on a basis of an operation of another user different from a user of the information processing device.

(21)

A method of processing information, the method including:
acquiring a graph structure searched for on a basis of information related to a structure of a graph-structured network.

(22)

A method of providing information, the method including:
providing performance of a graph structure searched for on a basis of information related to a structure of a graph-structured network.

REFERENCE SIGNS LIST 1 information processing system
10 information processing device
110 operation unit
120 control unit
121 data acquisition unit
122 structure acquisition unit
123 structure extraction unit
124 transmission control unit
125 output control unit
130 communication unit
140 storage unit
150 display unit
20 information providing device
220 control unit
221 acquisition unit
222 learning processing unit
223 recording control unit
224 transmission control unit
230 communication unit
240 storage unit
250 search history database
260 structure information database

The invention claimed is:

1. An information processing device comprising:
a structure acquisition unit configured to
acquire a graph structure searched for on a basis of information related to a structure of a graph-structured network, and
acquire a plurality of graph structures and a performance index of the graph structure, the graph structure being further generated depending on information related to a structure specified by a user,
wherein the graph structure is generated based on a network structure group registered in advance, the network structure group including a result obtained by a previously performed network search, and
wherein the network structure group includes a partial structure commonly appearing beyond a predetermined frequency in a plurality of full structures determined to have higher performance than predetermined performance; and an output control unit configured to control output of the graph structure and the performance index,
wherein the structure acquisition unit and the output control unit are each implemented via at least one processor.

2. The information processing device according to claim 1,
wherein the network structure group includes a full structure of a network searched previously.

3. The information processing device according to claim 2,
wherein the graph structure is generated on a basis of a graph structure-based search in the full structure.

4. The information processing device according to claim 1,
wherein the graph structure is generated depending on a full structure having higher performance than predetermined performance selected from the network structure group.

5. The information processing device according to claim 2,
wherein the network structure group includes the full structure determined to have higher performance than predetermined performance.

6. The information processing device according to claim 1,
wherein the network structure group includes a partial structure of a network searched previously.

7. The information processing device according to claim 6,
wherein the graph structure is generated on a basis of a connection of the partial structure to another structure.

8. The information processing device according to claim 1,
wherein the information related to the structure includes information related to a fixed area to be included in the graph structure.

9. The information processing device according to claim 8,
wherein the information related to the fixed area includes a connection relationship between a plurality of nodes included in the fixed area and a position of the fixed area in the graph structure, and
the graph structure is generated so that the plurality of nodes have the connection relationship and exist at the position of the fixed area.

10. The information processing device according to claim 8,
wherein the fixed area is determined on a basis of a user's selection operation with respect to a predetermined network structure.

11. The information processing device according to claim 1,
wherein the information related to the structure includes a predetermined network structure in which a part of the predetermined network structure is set as a search area.

12. The information processing device according to claim 11,
wherein information related to the search area includes a connection relationship between a plurality of nodes that constitute a portion other than the search area and a position of the portion other than the search area in the graph structure, and
the graph structure is generated so that the plurality of nodes have the connection relationship and exist at the position of the portion other than the search area.

13. The information processing device according to claim 11,
wherein the search area is determined on a basis of a user's selection operation with respect to the predetermined network structure.

14. The information processing device according to claim 1,
wherein the information related to the structure includes a condition to be fulfilled by the graph structure.

15. The information processing device according to claim 1,
wherein the output control unit controls display of the graph structure and the performance index.

16. The information processing device according to claim 1, further comprising:
a structure extraction unit configured to extract a partial structure appearing beyond a predetermined frequency in a graph structure having higher performance than predetermined performance among the graph structures,
wherein the structure extraction unit is implemented via at least one processor.

17. The information processing device according to claim 16,
wherein the output control unit controls predetermined display corresponding to the partial structure.

18. The information processing device according to claim 1,
wherein the network structure group includes a network structure searched for on a basis of an operation of another user different from a user of the information processing device.

19. The information processing device according to claim 1,
wherein the network structure group further includes information regarding a structure of a network obtained by the network search.

20. A method of processing information, the method comprising:
acquiring a graph structure searched for on a basis of information related to a structure of a graph-structured network;
acquiring a plurality of graph structures and a performance index of the graph structure, the graph structure being further generated depending on information related to a structure specified by a user,
wherein the graph structure is generated based on a network structure group registered in advance, the network structure group including a result obtained by a previously performed network search, and
wherein the network structure group includes a partial structure commonly appearing beyond a predetermined frequency in a plurality of full structures determined to have higher performance than predetermined performance; and
controlling output of the graph structure and the performance index.

21. A method of providing information, the method comprising:
providing performance of a graph structure searched for on a basis of information related to a structure of a graph-structured network;
providing performance of a plurality of graph structures and a performance index of the graph structure, the graph structure being further generated depending on information related to a structure specified by a user, wherein the graph structure is generated based on a network structure group registered in advance, the network structure group including a result obtained by a previously performed network search, and wherein the network structure group includes a partial structure commonly appearing beyond a predetermined frequency in a plurality of full structures determined to have higher performance than predetermined performance; and controlling output of the graph structure and the performance index.

22. A non-transitory computer-readable medium having embodied thereon a program, which when executed by a computer causes the computer to execute a method, the method comprising:

acquiring a graph structure searched for on a basis of information related to a structure of a graph-structured network;

acquiring a plurality of graph structures and a performance index of the graph structure, the graph structure being further generated depending on information related to a structure specified by a user, wherein the graph structure is generated based on a network structure group registered in advance, the network structure group including a result obtained by a previously performed network search, and wherein the network structure group includes a partial structure commonly appearing beyond a predetermined frequency in a plurality of full structures determined to have higher performance than predetermined performance; and controlling output of the graph structure and the performance index.

* * * * *